July 18, 1967  C. H. THOMAS  3,331,900
METHOD OF EXTRUDING A SKIN COATED FOAMED PLASTIC ARTICLE
Filed Oct. 8, 1963
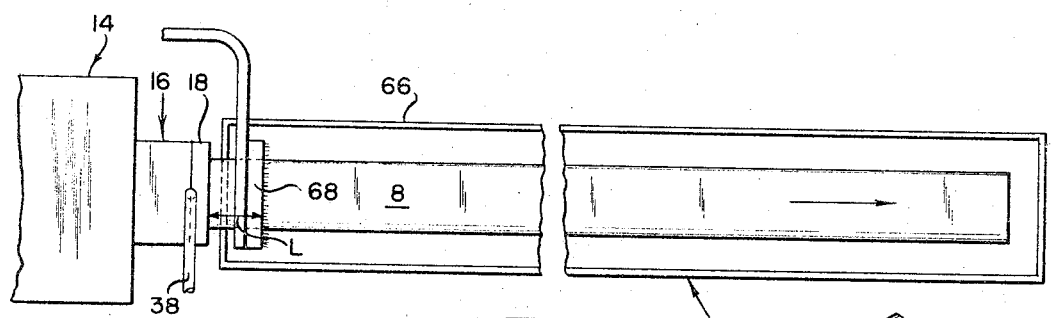
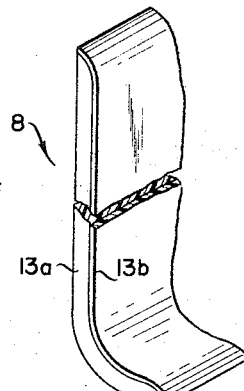
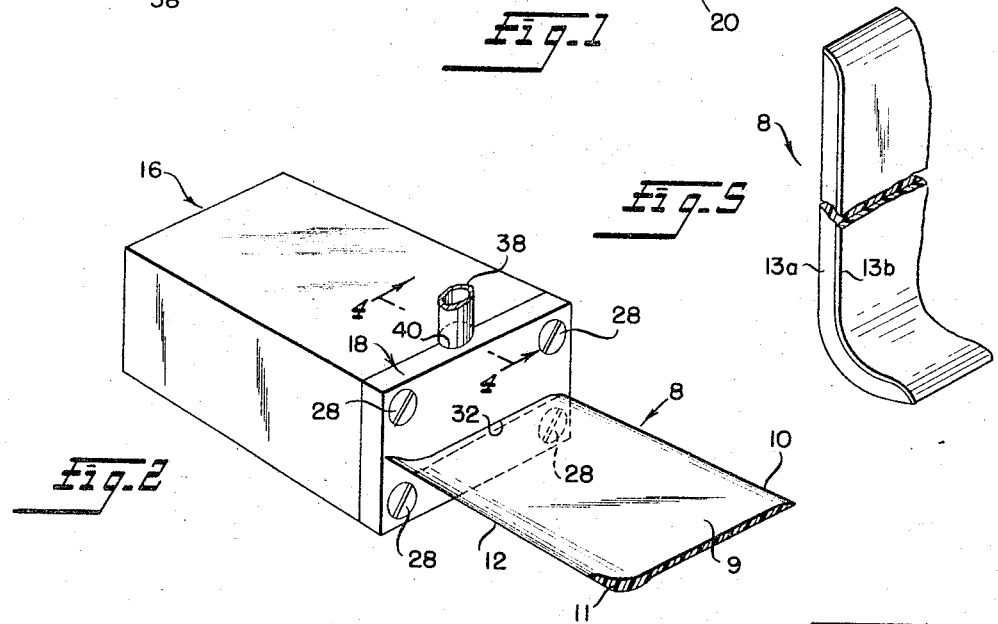
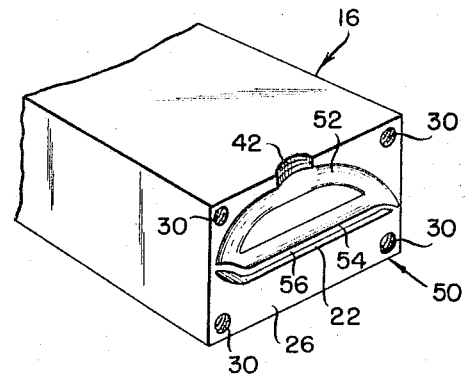
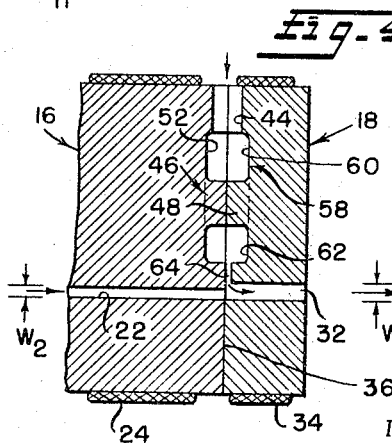
INVENTOR
Cyrus H. Thomas
BY Strauch, Nolan & Neale
ATTORNEY

United States Patent Office 3,331,900
Patented July 18, 1967

3,331,900
METHOD OF EXTRUDING A SKIN COATED FOAMED PLASTIC ARTICLE
Cyrus H. Thomas, Miami, Fla., assignor to Industrial Vinyls, Inc., Miami, Fla., a corporation of Florida
Filed Oct. 8, 1963, Ser. No. 314,699
9 Claims. (Cl. 264—47)

This invention relates to methods of producing novel extruded plastic shapes.

The present invention has been employed to produce an extruded plastic cove base which is superior to the plastic and rubber cove bases now commercially available. For the sake of clarity, the principles of the present invention will be developed by relating them to this particular product. It is to be understood, however, that this product is merely exemplary and that the present invention is not limited to this particular product and its manufacture.

The principles of the present invention may be employed to particular advantage to produce improved cove base of the type shown in United States Patent No. 2,300,084, issued to Clarence Wright Oct. 27, 1942, for Floor Covering. In general, in producing such cove base by the present invention, a foamed plastic base material that is light in weight and relatively soft and pliable when cured is extruded through a conventional extruder die (the primary die). The extruded melt issuing from this die is passed through an auxiliary die in which the base material is expanded. As it passes from the primary into the auxiliary die, an overlay of skin coating material is fed onto the base material. The coating material, which is dense and wear resistant when cured, is fused to the surface of the expanding base material as it passes through the auxiliary die. As the extruded, coated, and expanded melt issues from the auxiliary die, it is quickly cooled to prevent the formation of blisters and other surface imperfections.

The cove base produced by this novel process has the following advantages not found in conventional, commercially available plastic and rubber cove bases:

(1) The cove base is much lighter in weight.
(2) The cove base is much more easily cut for matching of butt joints during installation.
(3) The cove base has exceptionally low shrinkage properties.
(4) Since the main body of color is in the skin coat this makes production of reproducible colors much simpler.
(5) The high strength and minimal thickness of the skin coat makes "turning corners" a simpler and easier job.
(6) The extrusion properties of the formulation and the conditions used in production reduce the set-up time considerably.
(7) The cove has better adhesion with normal installation.
(8) The outer surface of the cove base has a high degree of gloss and smoothness.
(9) The configuration of the cove base is more easily maintained and with a higher degree of certainty.
(10) An improved bond between the cove base and various wall surfaces may be obtained.

Several of these advantages are due, at least in part, to the use, in practicing the present invention, of base material and skin coating formulations which are heavily loaded with an inorganic filler. The practice of using various clays, diatomaceous earth, carbonates, marble dust, and other inorganic materials as fillers in plastics is common. However, the addition of these materials in high concentrations causes tremendous increases in the specific gravity (and therefore the weight of a given volume) of materials produced from these loaded formulations. Furthermore, there are practical limitations as to the quantities of filler which may be added in obtaining any given hardness, flexibility, surface gloss, brittleness, tensile strength, elongation or processability.

One well-known method of overcoming the increase in specific gravity of loaded plastic is to add air to the formulation to produce a foam or sponge. However, foaming normally gives a rough surface and variation in color due to differences in the thickness of the formulation over the bubbles as compared to the boundary lines between bubbles. However, by applying a properly formulated skin coating in accordance with the principles of the present invention, these surface and color imperfections are concealed, the color is smoothed out, and, in addition, any desired degree of surface gloss may be provided.

Another advantage of the present invention is that it is highly versatile and can be employed with a wide variety of formulations. For many applications polyvinyl resins can most advantageously be employed in the base and skin coating formulations. However, by proper formulation, polyurethanes, polyethylenes, polypropylenes and copolymers of the monomers in the foregoing may be employed to obtain other advantages such as chemical resistance, abrasion resistance, oil resistance, special color effects, ultraviolet resistance, special patterns, or any other special properties desired in the finished product.

Among the more important objects of this invention are:
(1) The provision of novel improved processes for producing lightweight, skin coated, extruded plastic articles;
(2) The use of novel formulations for producing lightweight extruded plastic articles of improved quality;
(3) The manufacture of novel, lightweight, skin coated, plastic shapes and articles; and
(4) The manufacture of improved cove base.

Other objects and further novel features of the present invention will become more fully apparent from the appended claims and as the ensuing detailed description and discussion proceeds in conjunction with the accompanying drawing, in which:

FIGURE 1 is a partial plan view of the novel extrusion molding apparatus provided by the present invention;

FIGURE 2 is a perspective view of the primary and auxiliary dies employed in the apparatus of FIGURE 1;

FIGURE 3 is a partial perspective of the primary die and the skin coating material feed channels formed in its exit end face;

FIGURE 4 is a section through the primary and auxiliary dies, taken substantially along line 4—4 of FIGURE 2, illustrating the skin coating feed channels; and FIGURE 5 is a sectioned perspective of a cove base prepared in accordance with the principles of the present invention.

Referring now to the drawing, the novel apparatus and process of the present invention may be advantageously employed to provide an improved cove base of the type shown in FIGURE 2, although they are by no means limited in application to the production of this particular item. Cove base 8 includes a vertically disposed elongated body 9, the upper edge of which can be tapered or rounded off, as at 10, if such should be desired. The lower edge of the body 9 has formed thereon a downwardly and forwardly extending angularly disposed flexible foot 11. This foot projects a material distance in advance of the body 9 and terminates in a tapered or feather-edged toe 12. This peculiar configuration and its advantages are described in detail in the Wright patent referred to above to which reference may be had if deemed necessary to an understanding of the present invention.

As discussed above, a materially improved cove base of this type can be produced by forming the cove base of a foamed plastic core 13a onto which a skin coating 13b is fused (see FIGURE 5).

Basically, the novel apparatus of the present invention in which cove base 8 is formed consists of a conventional extruder 14 provided with an apertured or cored primary die 16, a cored auxiliary die 18, and a cooling unit 20 into which the formed cove base 8 passes as it emerges from auxiliary die 18.

Extruder 14 may be of any desired type. Suitable extruders are described and discussed in pages 744–766 of the Modern Plastics Encyclopedia (1963 issue) to which reference may be had if desired. Since the extruders employed in the present invention are of conventional construction and are adequately described elsewhere, it is not seen that they need to be described in detail herein.

Primary die 16 is also, in main part, of conventional construction and is provided with a hollow core 22 having substantially the same cross-sectional configuration as cove base 8. Standard band-type heaters 24 (see FIGURE 4) or other appropriate surface heaters are employed to maintain primary die 16 at the proper extruding temperature. Appropriate controls (not shown) including sensing elements responsive to the temperature of the melt passing through primary die 16 may be employed to control the operation of band heaters 24.

As shown in FIGURES 2 and 3, auxiliary die 18 is a relatively thin block fixed to the exit end face 26 of primary die 16 as by screws 28 which extend through the auxiliary die into threaded apertures 30 in the primary die end face. The core 32 (see FIGURES 2 and 4) in auxiliary die 18 is of substantially the same configuration of and is aligned with the core 22 in primary die 16. However, as shown in FIGURE 4, the width $W_1$ of core 32 in auxiliary die 18 is greater than the corresponding width $W_2$ of the core 22 in primary die 16. This discrepancy in core width is purposely provided to permit the melt passing from primary die 16 into auxiliary die 18 to expand as it passes through the auxiliary die. This combination of primary and auxiliary dies with the relative core sizes described above is an important feature of the present invention since it permits the production of materially expanded articles of substantially decreased specific gravity.

Auxiliary die 18 is provided with surface heaters 34. These may be of the same type as the heaters 24 provided for primary die 16 and may be controlled by the same type of system as the latter. The control systems, however, are preferably independent so that primary die 16 and auxiliary die 18 may be maintained at different temperatures.

As discussed above, many of the advantages of the novel extruded plastic shapes and articles provided by the present invention are obtained by feeding a skin coating material onto the foamed plastic core of the article or shape and thereafter fusing it to the core. Referring now to FIGURES 2–4, the skin coating material is fed onto the melt exiting from primary die 16 into auxiliary die 18 at the juncture 36 of these dies. The skin coating feed system may be of any desired type but, as illustrated, includes a supply conduit 38 connected at one end to a suitable extruder (not shown) and at the other, into an aperture 40 formed by cooperating semicircular threaded grooves 42 and 44 in the two dies 16 and 18. Channel 40 communicates with a coathanger-like distribution system 46 formed by cooperating grooves cut in the apposite surfaces 26 and 48 of the primary and auxiliary dies 16 and 18, respectively.

As shown in FIGURE 3, the groove 50 in exit end face 26 of primary die 16 includes a generally horizontally oriented, upper, arcuate groove portion 52 which communicates with a substantially horizontal, straight, lower groove portion 54. Groove portion 54 is disposed in vertically spaced, parallel, relation to die core 22 and has a lower edge 56 of substantially the same configuration as and substantially coextensive in width with the upper surface of core 22.

The groove 58 cut in the entrance end face 48 of auxiliary die 18 is also of the configuration just described and includes an upper, arcuate groove portion 60 and a lower, straight, groove portion 62.

Communication between the above-described portion of the skin coating feeding system and the core 32 in auxiliary die 18 is provided by a horizontal slot 64 in the entrance end face 48 of auxiliary die 18 which extends between lower groove portion 62 and core 32. Slot 64 is preferably coextensive in length with the major lateral dimension of the cove base 8 to ensure that the skin coating material will be evenly distributed over the entire profile of the cove base.

The cooling unit 20 is of standard construction; in its preferred, illustrated embodiment, it includes a water-filled tank 66 and a cascade type cooling unit 68 beneath which the melt exiting from auxiliary die 18 passes to cooling tank 66. The distance L (see FIGURE 1) which the melt travels after exiting from auxiliary die 18 until it is struck by the water cascade 68 is preferably not greater than one inch although, depending upon the skin coating formulation and the amount of blowing agent in the base material, it is possible to increase this distance. The cooling technique, however, is critical in that it controls the surface blistering of the extruded article; and it will, in most instances, be necessary to maintain the distance L not greater than one inch to prevent formation of this type of surface imperfection.

In operation, a foamed plastic base material is fed from extruder 14 through primary die 16 where it assumes the configuration of core 22. As the melt exits from primary die 16 it is coated with an overlay of skin coating material fed onto the melt as it enters core 32 through the skin coating feeding system described above. As the molten base and skin coating materials pass through the core 32 of auxiliary die 18, the foamed base material expands and the skin coating material is fused to it. The melt then exits from auxiliary die 18 and the base and skin coating materials, which have been completely fused together in the auxiliary die, are cooled in the cooling unit 20 described above to produce the final article shown in FIGURE 5.

For optimum results, certain parameters of the extruding operation must be maintained substantially constant. Of extreme criticality is the melt temperature which controls the shrinkage characteristics, surface quality, amount of blowing, and the rate of extrusion. As will be discussed below, the beneficial results of the present invention are, in part, achieved by the use of certain novel formulations of the base and skin coating materials. For the disclosed materials, the melt temperature is preferably maintained in the range of 300° F. to 390° F. The preferred range, which provides the best results, is 360° F. to 380° F.

Also of substantial importance are the relative dimensions $W_1$ and $W_2$ of the cores 32 and 22 in the auxiliary and primary dies 16 and 18. For example, if it desired to expand the foamed plastic 20% and to overlay the base material with a 0.010 inch thick skin coat, dimension $W_1$ of auxiliary die 18 must be 20% greater than the width $W_2$ of primary die 16 plus 0.010 inch.

In addition to the novel extrusion apparatus described above, the improved beneficial novel results of the present invention are also, in part, attributable to the novel formulations of the base material and the skin coating material. In the following description of these formulations, certain ingredients are referred to by their trade designation for the sake of brevity and clarity. These trade names and the materials they identify are set forth below in Table A in tabular form.

TABLE A

| Trade Name | Chemical Description | Structural Formula |
| --- | --- | --- |
| DOP | Di(2-ethylhexyl) phthalate | $C_6H_4(COOC_8H_{17})_2$ |
| DIOP | Di-isooctyl phthalate | $C_6H_4(COOC_8H_{17})_2$ |
| TCP | Tricresyl phosphate | $(CH_3C_6H_4O)_3PO$ |
| Chlorowax 40 | Chlorinated paraffin | $C_{24}H_{43}Cl_7$ (empirical formula) |
| Nitrosan | N,N'-Dimethyl-N,N'-dinitrosoterephthalamide | $H_3C-N-OC-\langle\ \rangle-CO-N-CH_3$ ; NO, NO |
| Celogen AZ | Azobisformamide (Azocarbonamide) | $H_2N-CO-N=N-CO-NH_2$ |
| Atomite | Mechanically ground calcium carbonate | $CaCO_3$ |

| Trade Name | Description |
| --- | --- |
| LPV | A mixture of highly aromatic hydrocarbon obtained from petroleum and having, typically, a specific gravity of 0.865, a molecular weight of 300, a bromine number of 0.40, and an aniline point of 30° C. |
| Conoco H300 | A mixture of highly aromatic hydrocarbons obtained from petroleum and having, typically, a specific gravity of 0.884, an aniline point of 160° F., a pour test of 65° F., and a neutralization number of 0.05. |

The compostion of these plasticizers may vary slightly depending upon the composition of the crude. Many other suitable synthesized hydrocarbon plasticizers are also available. A number of these are listed on pages 466 and 467 of Modern Plastics Encyclopedia (1963 issue).

The following are preferred base material formulations.

*Formulation I*

Ingredient: Parts by wt.
- Resin (polyvinyl chloride) _____ 100.0
- Primary plasticizer (DOP, DIOP, TCP, etc.) _ 45.0
- Epoxidized soybean oil secondary plasticizer (LPV, Chlorowax 40, Conoco H300, etc.) _ 5.0
- Barium cadmium stabilizer _____ 2.0
- Stearic acid _____ 0.5
- Lead stearate _____ 1.0
- Atomite _____ 75.0

*Formulation II*

Ingredient:
- Resin (polyvinyl chloride) _____ 100.0
- Primary plasticizer _____ 45.0
- Epoxidized soybean oil _____ 15.0
- Barium cadmium stabilizer _____ 1.0
- Stearic acid _____ 1.5
- Atomite _____ 200.0

*Formulation III*

Ingredient:
- Resin (polyvinyl chloride) _____ 100.0
- Primary plasticizer _____ 41.0
- Secondary plasticizer _____ 7.0
- Barium cadmium stabilizer _____ 2.0
- Stearic acid _____ 1.0
- Atomite _____ 300.0

Pigments may be added to the base material formulation in any desired quantity to obtain various colors without detrimental effect on the final extruded product. Suitable pigments are discussed in pages 490–496 of Modern Plastics Encyclopedia (1963 issue) to which reference may be made if desired.

The selected base material formulation is thoroughly mixed with a blowing agent (nitrosan or Celogen AZ, for example) in a ratio ranging from 6 grams of blowing agents per 100 pounds of the formulation to 100 grams of blowing agent per 100 pounds of the formulation before it is charged to the extruder. The particular ratio will depend upon the application since it is, by varying this ratio, that the desired amount of blowing is obtained. For best operation of extruder 14 and for best control of surface quality, the ratio of blowing agent to base material formulation is preferably maintained in the range of from 20 to 40 grams of blowing agent per 100 pounds of base material formulation.

The blowing agent may be added either in dry or paste form. The preferred method is to add the blowing agent to the base material formulation as a paste consisting of 50 to 70% blowing agent in DOP.

Satisfactory and useful base material formulations may be produced by varying the ratio of filler material to resin from no filler material to as high as 400 parts of filler per 100 parts of resin. From economy and compounding standpoints, however, it will generally be impractical to use a base material formulation which contains less than 50 parts of filler per 100 parts of resin or more than 300 parts of filler per 100 parts of resin. The preferred range is from 150 to 250 parts of filler per parts of resin.

The base material formulations may be prepared by any one of a number of standard procedures. In the lower filler/resin ratios, the base material formulations may be successfully extrusion compounded. In the higher filler/resin ratios, they may be prepared by mill working. A Banbury or similar apparatus may, if desired, equally well be employed to prepare the base material formulation.

The following are the preferred skin coating material formulations.

*Formulation IV*

Ingredient: Parts by wt.
- Resin (polyvinyl chloride) _____ 100.0
- Primary plasticizer _____ 42.0
- Epoxidized soybean oil _____ 5.0
- Barium cadmium stabilizer _____ 2.0

*Formulation V*

Ingredient:
- Resin (polyvinyl chloride) _____ 100.0
- Primary plasticizer _____ 45.0
- Epoxidized soybean oil _____ 5.0
- Barium cadmium stabilizer _____ 2.0
- Stearic acid _____ 0.5
- Lead stearate _____ 1.0
- Atomite _____ 75.0

*Formulation VI*

Ingredient:
- Resin (polyvinyl chloride) _____ 100.0
- Primary plasticizer _____ 15.0
- Epoxidized soybean oil _____ 10.0
- Secondary plasticizer _____ 5.0
- Barium cadmium stabilizer _____ 2.0
- Stearic acid _____ 1.0
- Atomite _____ 40.0

In the skin coating material formulations, the ratio of filler to resin may vary from zero filler content to about 100 parts of filler per 100 parts of resin. Preferably, this ratio is maintained in the range of from 30 parts of filler per 100 parts of resin to 80 parts of filler per 100 parts of resin.

The skin coating material formulations may be prepared in substantially the same manner as the base material formulations discussed above.

Many of the ingredients employed in the preferred formulations set forth above may be varied without exceeding the scope of the present invention. For example, Modern Plastics Encyclopedia (1963 issue) on pages 460–477 lists a number of commercially available plasticizers which may be employed in the place of those exemplary plasticizers listed above. On pages 502–505 of the same publication, a number of stabilizers are discussed which may be substituted for the barium cadmium stabilizer employed in the preferred formulations. Similarly, on pages 612–618 of this publication are listed a number of fillers which may be substituted for the Atomite employed in the preferred formulations. Also, on pages 506–508 of this publication are listed antioxidants which may be employed in the stead of the stearic acid and lead stearate listed above.

Moreover, these formulations are not restricted to the use of vinyl chloride polymers as a resin. With only slight modifications, which may be readily determined, polyurethane, polyethylene, and polypropylene polymers and copolymers of the foregoing may be successfully utilized. By employing such alternate materials, other advantages desirable for particular applications may be achieved as was pointed out above. Such alternate resins may be employed in both the base material and skin coating material formulations.

It will be apparent, from the foregoing discussion of one exemplary article produced by the present invention, that this invention is by no means limited to the production of this particular article. On the contrary, many different types of articles, which can advantageously utilize the novel properties and advantages provided by the present invention, may be produced in accordance with its principles.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The process of producing improved, lightweight, skin coated, extruded, plastic articles, comprising:
    (a) extruding a foamed plastic base material through a primary die;
    (b) expanding the plastic material extruded from said primary die and forming it to its final cross-sectional configuration by feeding it from said primary die through an auxiliary die of greater core size than the primary die;
    (c) fusing a coating to said plastic base material as it passes through said auxiliary die by feeding a stream of coating material onto and distributing it over the surface of said plastic material as the latter moves through the auxiliary die while maintaining said base material at an elevated temperature to promote the adhesion of the coating material to the base material; and
    (d) cooling the extruded, coated and expanded base material without further changing the configuration of the article as it emerges from the auxiliary die.

2. The process as defined in claim 1 wherein said base material is extruded at a temperature in the range of 300–390° F.

3. The process as defined in claim 1, wherein said base material is extruded at a temperature in the range of 360–380° F.

4. The process as defined in claim 1, wherein the extruded, coated, and expanded base material is subjected to cooling within not more than about one inch from the exit of the auxiliary extruder die.

5. The process as defined in claim 1, wherein said primary and auxiliary dies are independently heated.

6. The process as defined in claim 1, wherein the base material comprises a resin and a filler and the ratio of filler to resin is between about 150:100 and 250:100.

7. The process as defined in claim 1, wherein a blowing agent is mixed with said base material before said material is extruded, the ratio of blowing agent to base material being between about 6 grams/100 pounds and 100 grams/100 pounds.

8. The process as defined in claim 7, wherein the ratio of blowing agent to base material is between about 20 grams/100 pounds and 40 grams/100 pounds.

9. The process as defined in claim 1, wherein said coating material includes a resin and a filler, the ratio of filler to resin ranging from about 30:100 to about 80:100.

References Cited

UNITED STATES PATENTS

| | | | |
|---|---|---|---|
| 2,256,483 | 9/1941 | Johnston | 264—54 XR |
| 2,537,977 | 1/1951 | Dulmage | 265—53 |
| 2,872,965 | 2/1959 | Sisson | 264—47 |
| 2,884,668 | 5/1959 | Harris et al. | 20—69 |
| 3,029,476 | 4/1962 | Merck et al. | 264—47 |
| 3,042,972 | 7/1962 | Lafferty | 264—53 |
| 3,216,164 | 11/1965 | Stillman | 52—309 |
| 3,222,722 | 12/1965 | Reifenhauser | 264—47 XR |
| 3,229,005 | 1/1966 | Reifenhauser | 264—47 |

FOREIGN PATENTS

| | | |
|---|---|---|
| 242,067 | 12/1962 | Australia. |
| 690,554 | 7/1964 | Canada. |

ALEXANDER H. BRODMERKEL, *Primary Examiner.*

P. E. ANDERSON, *Examiner.*